US006910828B1

(12) United States Patent
Hughes

(10) Patent No.: US 6,910,828 B1
(45) Date of Patent: Jun. 28, 2005

(54) SHOPPING CART COLLECTION, STORAGE, AND RETRIEVAL SYSTEM

(76) Inventor: Metra Hughes, 1712 Arabian Dr., Loxahatchee, FL (US) 33470

( * ) Notice: Subject to any disclaimer, the term of this patent is extended or adjusted under 35 U.S.C. 154(b) by 0 days.

(21) Appl. No.: 10/771,858

(22) Filed: Feb. 3, 2004

(51) Int. Cl.[7] .............................................. E01F 9/00
(52) U.S. Cl. ....................................................... 404/9
(58) Field of Search ............................ 404/1, 6, 9, 71; 256/1

(56) References Cited

U.S. PATENT DOCUMENTS

| | | | | |
|---|---|---|---|---|
| 2,633,253 | A | * | 3/1953 | Martin ........................ 414/258 |
| 3,540,068 | A | * | 11/1970 | Bouthors ..................... 14/74.5 |
| 3,754,630 | A | | 8/1973 | Gilker |
| 3,837,455 | A | * | 9/1974 | Hurt ............................ 194/211 |
| 3,938,638 | A | | 2/1976 | Moule |
| 3,978,959 | A | | 9/1976 | Muellner |
| 4,101,234 | A | * | 7/1978 | Castaneda ....................... 404/6 |
| 4,236,697 | A | | 12/1980 | Savino |
| 4,424,893 | A | | 1/1984 | Gillet |
| 4,572,347 | A | | 2/1986 | Eisermann |
| 4,576,274 | A | | 3/1986 | Thorson |
| 5,360,094 | A | | 11/1994 | Adams |
| 5,473,991 | A | * | 12/1995 | Crum ........................ 104/172.3 |
| 5,529,163 | A | * | 6/1996 | Decker et al. .............. 194/212 |
| 2002/0159865 | A1 | | 10/2002 | Konstant |

FOREIGN PATENT DOCUMENTS

JP          10-238149      *   9/1998

* cited by examiner

Primary Examiner—Gary S. Hartmann
(74) Attorney, Agent, or Firm—McHale & Slavin, P.A.

(57) ABSTRACT

A self-guiding shopping cart collection, storage, and retrieval system is provided which is integrated into the parking lot construction. A collection channel is adjacent and parallel to a row of parking spaces which is formed as an inset trough configured to allow rolling translation of a shopping cart to a collection end. The collection channel has a generally planar floor and at least one inclined side bank with the floor being downwardly linearly inclined toward the collection end. Lateral feed channels intersect with the collection channel which are configured to allow rolling translation of a shopping cart from the parking lot into the collection channel. Thus, shopping carts from the parking lot are introduced into the lateral feed channels at the parking lot level and guided therethrough into the collection channel.

3 Claims, 4 Drawing Sheets

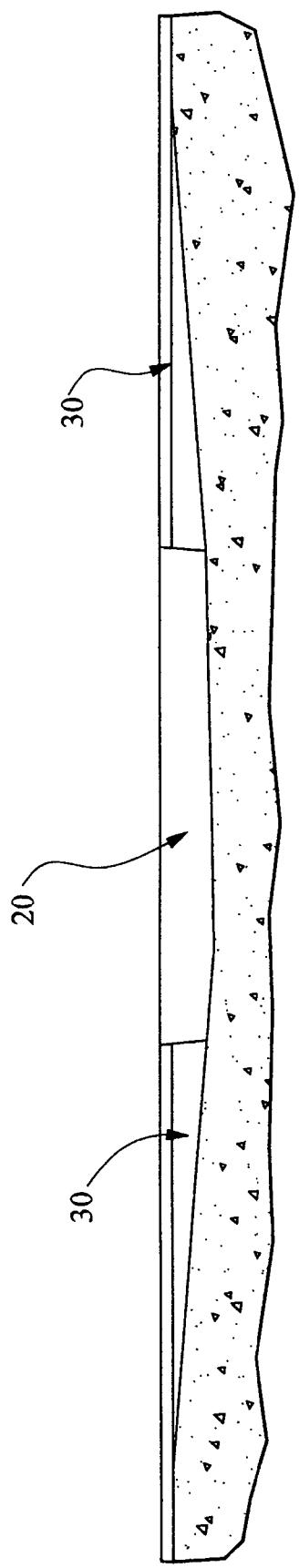
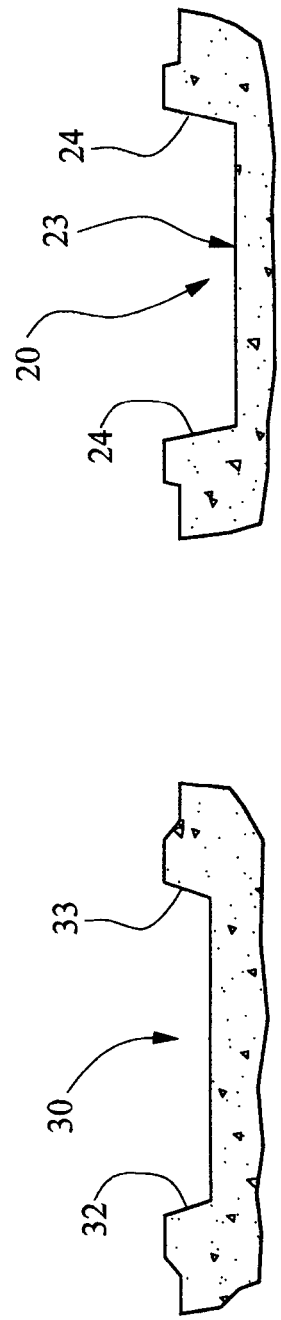
FIG. 3
FIG. 4
FIG. 5

SHOPPING CART COLLECTION, STORAGE, AND RETRIEVAL SYSTEM

FIELD OF THE INVENTION

This invention is related generally to the field of parking lot design retail establishments, and more particularly to a novel system for the collection, storage and retrieval of shopping carts in a parking lot.

BACKGROUND OF THE INVENTION

It is common practice in the art of merchandising for merchants to provide parking lots in which their patrons can conveniently park their automobiles and to provide wheeled, wire-basket type push carts, commonly referred to as shopping carts. Customers can deposit their purchases in these shopping carts while in the store and then the purchases can be transported, from the store, into the parking lot and to the customers' automobiles, for final transfer into their automobiles.

Large shopping centers which provide shopping carts for customer use can have parking lots which cover many acres of land. In such situations, customers typically move carts from the store in which they have shopped to their automobiles in the parking lot, and after they have transferred their purchased goods into their automobiles they generally simply leave the cart abandoned in the parking lot. The abandoned shopping carts in the parking lot are a nuisance, as they require the merchants to hire personnel to move about the parking lots, collect the carts and return them to the store for further use. These abandoned shopping carts also create serious traffic hazards in the parking lots, cause a disturbance in movement of vehicles throughout the lot, and are frequently damaged by customers' automobiles, and in turn cause damage to the automobiles. Moreover, such abandoned carts are subject to theft.

It has been clearly established that in places where customers have been encouraged to return carts to stores from adjacent parking facilities, and in those places where special facilities have been provided in parking areas to accommodate emptied carts, damage, theft and all other inconveniences normally associated with the provision and use of such carts has been materially and noticeably reduced.

It has also been determined that if customers are encouraged to deposit their empty carts in specially provided receivers located in parking lots great economic savings and more effective and efficient use of carts can be achieved.

Systems have been proposed for encouraging the users themselves to bring back to a storage station. One example is a system in which a voucher is issued to the customer attesting the return of the cart which includes a coupon or benefit of some sort. Various other methods have been proposed to alleviate the shopping cart abandonment problem, but none have been successfully employed. Accordingly, the only common method in use for protection from random storage of shopping carts is providing personnel for the continuous manual recovery of the carts from the lots.

A cart storage device which carts can be directed or stored is disclosed in U.S. Pat. No. 4,236,697, invented by Savino. This patent discloses a device, installed in parking lots or the like, consisting of upstanding rail guards within which carts can be directed or stored for recovery while being protected from damage by vehicles using the parking lot.

An apparatus for encouraging the restitution of shopping carts such as in a reception area otherwise controlled by wickets is disclosed in U.S. Pat. No. 4,428,893 invented by Gillet. This patent discloses an apparatus having vertically hinged doors and dispenses a ticket or token when the proper cart is moved therethrough. This apparatus also identifies unacceptable shopping carts, which are dissimilar to those for which the apparatus is designed.

Mueller teaches a cart conveyer and dispensing apparatus in U.S. Pat. No. 4,518,072. This invention is directed to an enclosed conveyor for propelling a shopping cart therethrough. Shopping carts are propelled by engagement of their wheels by a continuous member that carries a cross bump or upwardly extending protrusion.

Thus, what is needed is a shopping cart retrieval system which, without interfering with traffic flow, will facilitate retrieval of shopping carts from a parking area or the like, store carts, and can dispense them when desired.

SUMMARY OF THE INVENTION

It is an objective of the invention to provide a novel means for providing safe and efficient handling of carts.

It is another objective to provide a system for collection, storage and retrieval of shopping carts which is implement by providing a structure integrated into the construction of the parking lot.

It is still another objective to provide a system for collection, storage and retrieval of shopping carts which allows the customer to deposit the cart at the location of the customer's vehicle, and which does not require the customer to manually transport the cart to a central collection station, and which thus encourages use of the system by the customer.

It is yet a further objective of the invention to provide a system for collection, storage and retrieval of shopping carts which is self-guiding.

It is still a further objective of the invention to provide a method for constructing a structure from prefabricated components which provides a system for collection, storage and retrieval of shopping.

In accordance with the above objectives, a self-guiding shopping cart collection, storage, and retrieval system is provided which is integrated into the parking lot construction. The parking lot includes at least one array of a plurality of demarcated parking spaces arranged as a row with each of the parking spaces having demarcation lines on either side to define aisle ways between each of the parking spaces. A collection channel adjacent to and parallel to the row is formed as an inset trough configured to allow rolling translation of a shopping cart along the length of the row to a collection end. The collection channel has a generally planar floor and at least one inclined side bank with the floor being downwardly linearly inclined toward the collection end. A plurality of lateral feed channels aligned with each of the ailse ways intersect with the collection channel. Each lateral feed channel has opposing side banks which are configured to allow rolling translation of a shopping cart from the parking lot into the collection channel. The lateral feed channels each have a linearly inclined floor with an upper end contiguous to the parking lot and a lower end contiguous to the floor of the central channel whereby shopping carts from the parking lot can be introduced into the lateral feed channels at the parking lot level and guided therethrough by the opposing side banks into the collection channel. The collection end of the collection channel intersects with an oppositely sloping ramp whereby shopping carts in the collection channel can be pushed up the ramp to the parking lot.

The lateral feed channels can be formed by providing a plurality of barrier units having a quadrilateral configuration which are flushly adjoined to at least one of the opposing side banks of the collection channel. The barrier units are aligned with each of the plurality of parking spaces. Each of the barrier units includes a front curb portion adjacent to the floor of the collection channel and opposing side curb portions aligned with the demarcation lines, whereby the barrier units define a plurality of lateral feed channels intersecting with the collection channel and aligned with the aisle ways whereby shopping carts from the parking lot can be introduced into the lateral feed channels and are guided therethrough by the opposing side banks into the collection channel. The barrier units can be formed as a unitary piece from any suitable material, including concrete, rubber, plastic, recycled materials, wood, and metal.

BRIEF DESCRIPTION OF THE FIGURES

FIG. 3 is a cross-sectional view taken along the line 3—3 in FIG. 2;

FIG. 4 is a cross-sectional view taken along the line 4—4 in FIG. 2;

FIG. 5 is a cross-sectional view taken along the line 5—5 in FIG. 2; and

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
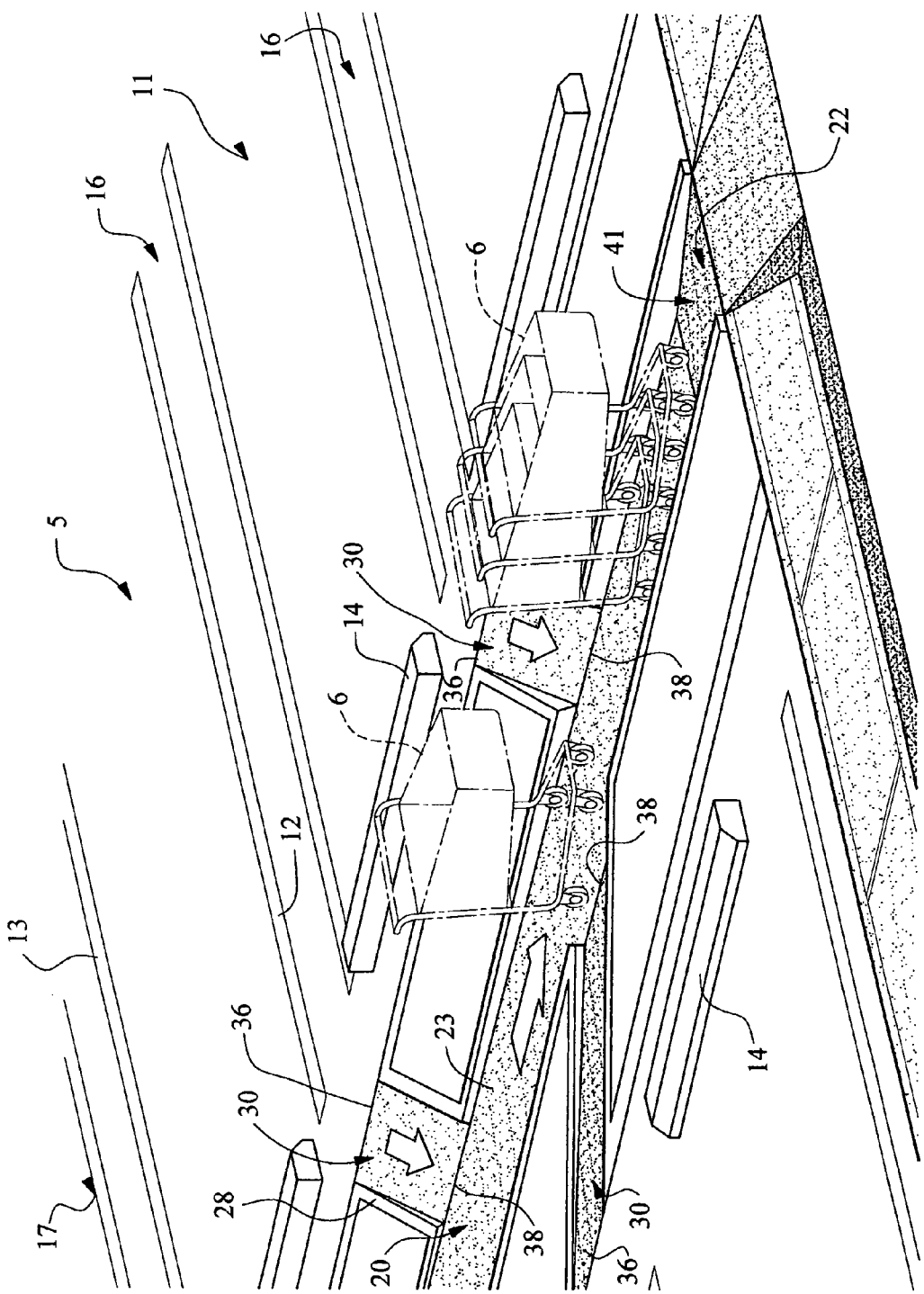
FIG. 1 is a perspective view of a system for collection, storage and retrieval of shopping carts according to a preferred embodiment of the invention with shopping carts shown therein in phantom.

FIG. 1 illustrates a perspective view of a self-guiding shopping cart collection, storage, and retrieval system according to a preferred embodiment of the invention. The system of the invention is implemented as a structure integrated into a parking lot construction, particularly a retail establishment parking lot where shopping carts are used. The overall arrangement can best be seen in the top plan view shown in FIG. 2. The parking lot, generally designated as 5, includes the usual array of demarcated parking spaces. The system includes a plurality of parking spaces 11 arranged as a row 17 which each include left and right demarcation lines 12,13 and a tire stop 14. The parking spaces 11 are spaced to define a plurality of aisle ways 16 therebetween. The aisle ways 16 are preferably bordered by the demarcation lines 12 and 13 of the adjoining parking spaces 11, and are sized to allow a shopping cart of average dimensions to pass therethrough without contact to vehicles parked in the parking spaces 11.

The system includes a collection channel 20 which is proximate to the tire stops 14. The collection channel 20 is adjacent and parallel to the rows 17 of parking spaces 11. The collection channel 20 is formed as an inset trough in the parking lot 5 and is configured to allow the rolling translation of a shopping cart along the length of the row 17 to a collection end 22. FIG. 1 illustrates shopping carts 6 shown in phantom inside the collection channel 20. As can be seen in the cross-sectional views shown in FIGS. 3 and 5, the collection channel 20 has a generally planar floor 23 and at least one inclined side bank 24 with the floor 23 being downwardly linearly inclined toward the collection end 22. In the practice of the invention, the collection channel 20 is constructed of a rigid, weatherproof material which is set into a substrate. The collection channel 20 can be constructed from the same material as the parking lot surface, such as concrete or asphalt. Any other material of a suitable hardness and durability can also be used, such as plastic, metal, fiberglass, etc.

A plurality of downwardly inclined lateral feed channels 30 intersect with the collection channel 20. The lateral feed channels 30 are dimensioned to receive forwardly rolling shopping carts and have an upper end 36 contiguous to the parking lot 5 and a lower end 38 contiguous to the floor 23 of the collection channel 20. The lateral feed channels 30 are aligned with the aisle ways 16 so that a shopping cart can be pushed through the aisle ways 16 between parked vehicles and directly into the lateral feed channels 30. The lateral feed channels 30 are configured to allow rolling translation of a shopping cart from the parking lot 5 into the collection channel 20. As shown in FIG. 4, each of the lateral feed channels 30 have opposing side banks 32, 33 which serve to maintain a shopping cart therein. Shopping carts from the parking lot can thus be introduced into the lateral feed channels 30 at the parking lot level and are then guided therethrough by the opposing side banks 32, 33 into the collection channel 20. The lateral feed channels 30 are preferably angled toward the collection end 22 so that shopping carts in the lateral feed channels 30 are directed into the collection channel 20 in a smooth uninterrupted fashion. The downwardly sloped floor 23 of the collection channel 20 then causes the shopping carts to roll toward the collection end 22. The collection channel 20 can include side banks 27, 28 located between the aisle ways 16 to help maintain the alignment of the carts in the collection channel 20. The collection end 22 of the collection channel 20 includes an oppositely sloping ramp 41 which extends from the floor 23 to the level of the parking lot. The ramp 41 serves to halt the downward rolling of the shopping carts and also the shopping carts to be pushed up the ramp 41 to the parking lot level so they can be retrieved.

Figure 2:
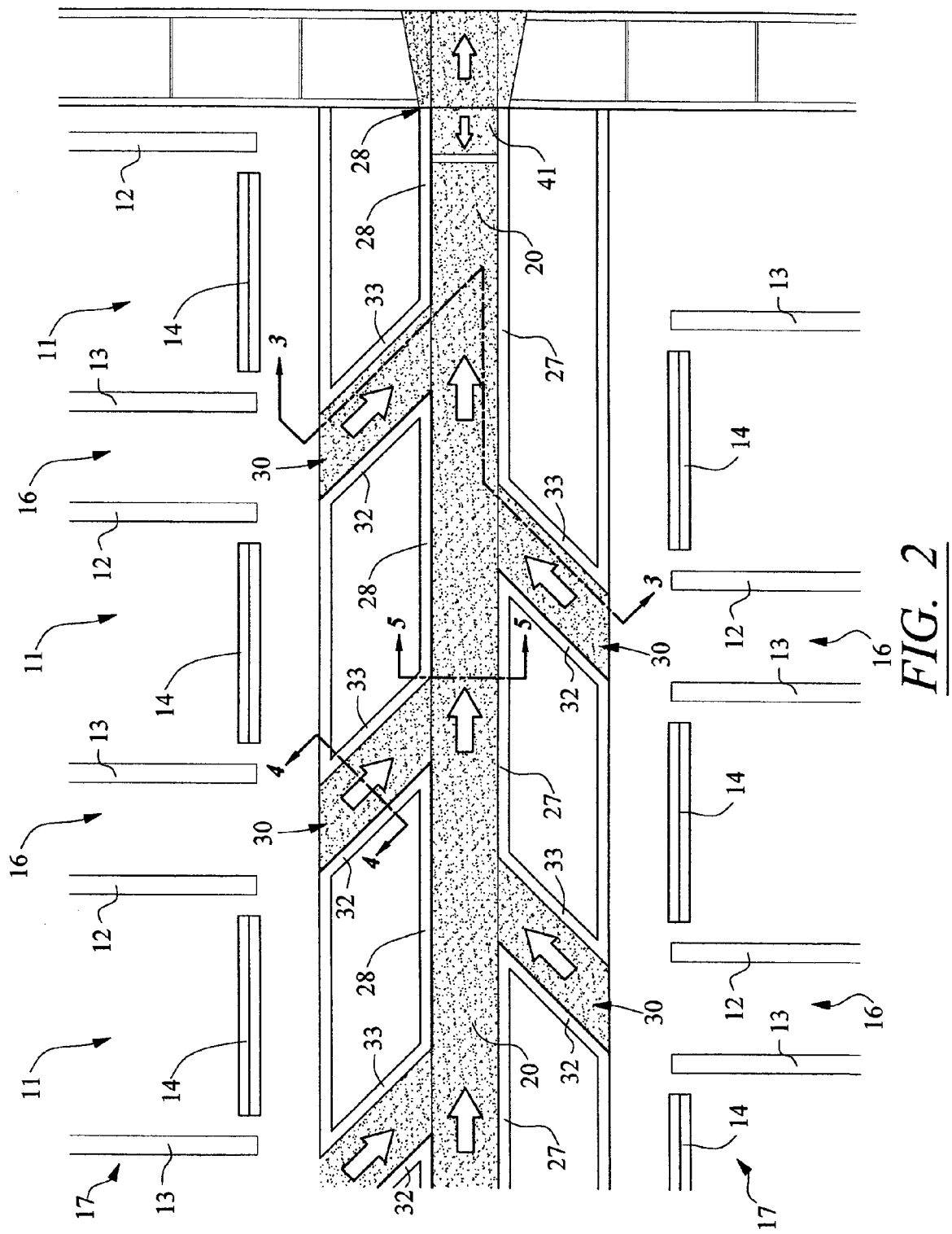
FIG. 2 is top plan view of the arrangement shown in FIG. 1.

The system of the invention in the foregoing description is depicted in terms of a single row 17 which is adjacent to a collection channel 20. However, as seen in FIGS. 1 and 2, the system of the invention can be implement using dual rows of parking spaces in a head to head arrangement which share the central collection channel 20. In this arrangement, the lateral feed channels 30 of the respective sides can be staggered to prevent collisions of the shopping carts within the channels.

Figure 6:
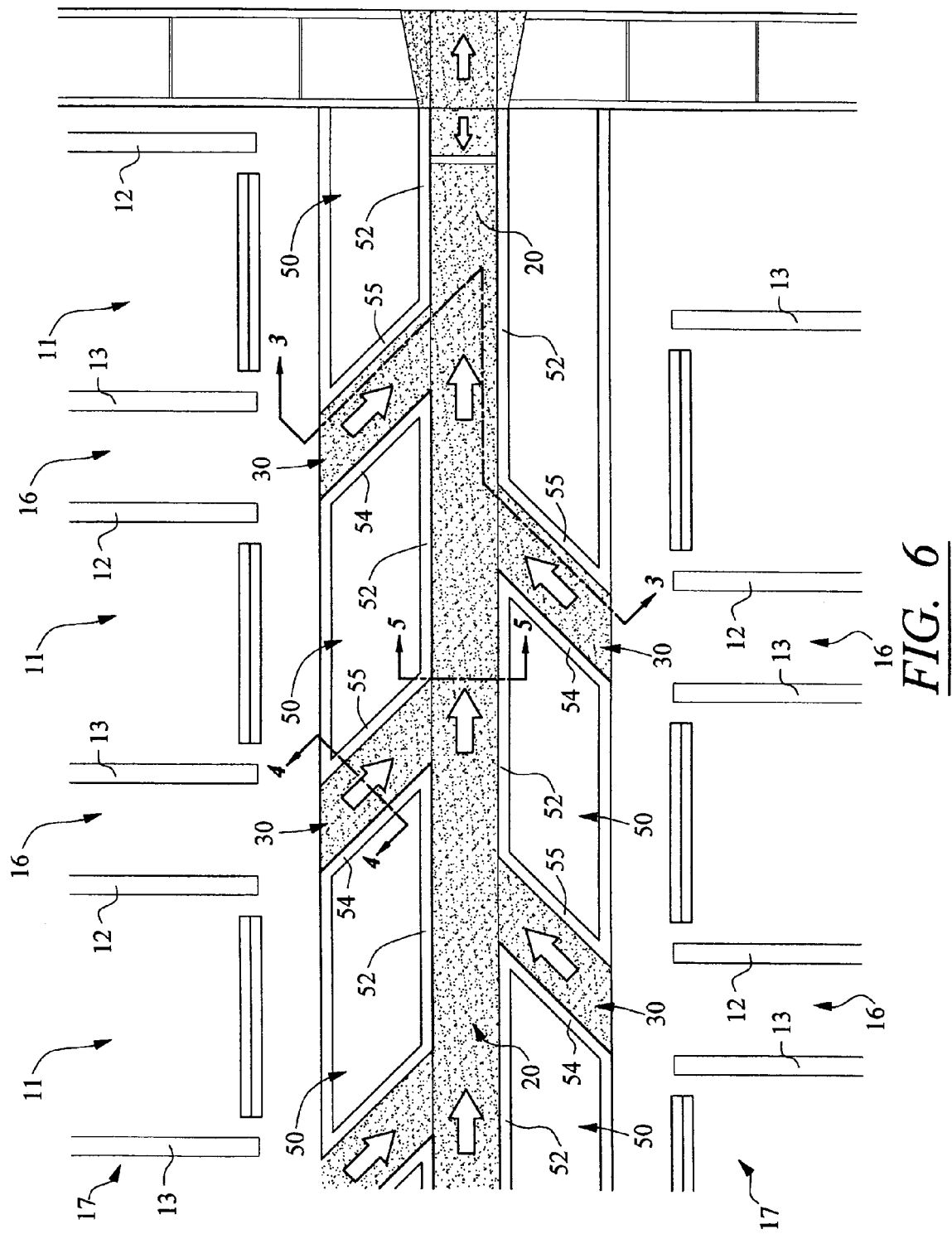
FIG. 6 is a top plan view of an alternative embodiment utilizing pre-fabricated components.

The above-described configuration can be constructed using any suitable methods and materials to provide the collection channel 20, lateral feed channels 30 and other inventive features described herein which are necessary to practice the invention. In an alternative embodiment depicted in FIG. 6, the system can be constructed using prefabricated components. In this embodiment, the collection channel 20 is constructed first to provide a base structure. The collection channel 20 is initially in the form of a generally semi-trapezoidal trough with a planar floor and opposing divergently inclined side banks (FIG. 5). The lateral feed channels 30 can be defined by providing a plurality of barrier units 50 having a quadrilateral configuration which are flushly adjoined to the opposing side banks of the collection channel 20. The barrier units 50 are aligned with each of the parking spaces 11 so that the lateral feed channels 30 thus defined are in alignment with the aisle ways 16. Each of the barrier units 50 includes a front curb portion 52 adjacent to the floor of the collection channel and opposing side curb portions 54, 55. The opposing side curb portions 54, 55 are approximately aligned with the demarcation lines 12, 13 of the parking spaces 11. In the preferred embodiment, the perimeters of the barrier units 50 are configured as parallelograms to provide the angled lateral feed channels 30.

The barrier units 50 can be formed from any suitable material, including concrete, rubber, plastic, recycled materials, wood, fiberglass, metal, etc. The barrier units 50 of the invention can be constructed in any number of configurations as may be desired dependent on the material being used. For example, the barrier units 50 can either be solid throughout or can have an open interior. The units 50 can be constructed to provide a central planar surface suitable for displaying indicia, such as retail logos or other advertising. Indicia can also be permanently incorporated into the surface in high or low relief.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. In a parking lot, a self-guiding shopping cart collection, storage, and retrieval system, comprising:

at least one array of a plurality of demarcated parking spaces arranged as a row having a length, wherein each of said parking spaces has demarcation lines on either side defining a plurality of aisle ways between said plurality of parking spaces;

a collection channel adjacent and parallel to said row formed as an inset trough configured to allow rolling translation of a shopping cart along the length of the row to a collection end, said collection channel having a generally planar floor and at least one inclined side bank wherein said floor is downwardly linearly inclined toward said collection end; and a plurality of lateral feed channels intersecting with said collection channel and aligned with said aisle ways, said plurality of lateral feed channels having said each having opposing side banks and configured to allow rolling translation of a shopping cart from the parking lot into said collection channel, said lateral feed channels having a linearly inclined floor with an upper end contiguous to said parking lot and a lower end contiguous to said floor of said central channel whereby shopping carts from the parking lot are introduced into said lateral feed channels and guided therethrough by said opposing side banks into said collection channel.

2. The system of claim 1, wherein said collection channel and said lateral feed channels are formed from a rigid material inset into a substrate.

3. The system of claim 1, wherein said collection end of said collection channel includes an oppositely sloping ramp intersecting with said floor of said collection channel whereby shopping carts in the collection channel can be pushed up the ramp to the parking lot.

* * * * *